US012580131B2

(12) United States Patent
Sato

(10) Patent No.: US 12,580,131 B2
(45) Date of Patent: Mar. 17, 2026

(54) METHOD FOR ALIGNING MULTILAYER COMPONENTS AND METHOD FOR MANUFACTURING MULTILAYER CERAMIC ELECTRONIC COMPONENTS INCLUDING ALIGNMENT METHOD

(71) Applicant: KYOCERA Corporation, Kyoto (JP)

(72) Inventor: Hisashi Sato, Kirishima (JP)

(73) Assignee: KYOCERA CORPORATION, Kyoto (JP)

( * ) Notice: Subject to any disclaimer, the term of this patent is extended or adjusted under 35 U.S.C. 154(b) by 0 days.

(21) Appl. No.: 18/686,606

(22) PCT Filed: Aug. 4, 2022

(86) PCT No.: PCT/JP2022/030008
§ 371 (c)(1),
(2) Date: Sep. 11, 2024

(87) PCT Pub. No.: WO2023/032591
PCT Pub. Date: Mar. 9, 2023

(65) Prior Publication Data
US 2025/0022659 A1    Jan. 16, 2025

(30) Foreign Application Priority Data
Aug. 30, 2021    (JP) ................................. 2021-140375

(51) Int. Cl.
*H01G 4/30*    (2006.01)

(52) U.S. Cl.
CPC ..................................... *H01G 4/30* (2013.01)

(58) Field of Classification Search
CPC ................................ H01G 4/30; H01G 13/00
See application file for complete search history.

(56) References Cited

U.S. PATENT DOCUMENTS

2005/0167243 A1*  8/2005  Yagi ................... B65G 47/1421
198/381

FOREIGN PATENT DOCUMENTS

| JP | 10-284355 A | | 10/1998 |
| JP | 2003007574 A | * | 1/2003 |
| JP | 2012-124525 A | | 6/2012 |
| JP | 2018-098413 A | | 6/2018 |
| JP | 2019-175902 A | | 10/2019 |
| JP | 2019-207904 A | | 12/2019 |
| JP | 2020-141085 A | | 9/2020 |

* cited by examiner

*Primary Examiner* — Kyle A Cook
(74) *Attorney, Agent, or Firm* — Volpe Koenig

(57)    ABSTRACT
Base components are placed into recesses of a holder. Each recess includes a flat bottom surface parallel to a horizontal direction. A lid is placed above the holder at a predetermined distance from the bottom surface. A magnetic field with a magnetic flux line intersecting perpendicularly with the bottom surface is caused to act on the base components in the recesses to rotate the base components about their longitudinal axes to have internal electrode layers parallel to the magnetic flux line.

5 Claims, 7 Drawing Sheets

METHOD FOR ALIGNING MULTILAYER COMPONENTS AND METHOD FOR MANUFACTURING MULTILAYER CERAMIC ELECTRONIC COMPONENTS INCLUDING ALIGNMENT METHOD

TECHNICAL FIELD

The present disclosure relates to a method for aligning multilayer components and a method for manufacturing multilayer ceramic electronic components including the alignment method.

BACKGROUND OF INVENTION

A known technique is described in, for example, Patent Literature 1.

CITATION LIST

Patent Literature

Patent Literature 1: Japanese Unexamined Patent Application Publication No. 2019-207904

SUMMARY

In an aspect of the present disclosure, a method for aligning multilayer components includes placing multilayer components each being rectangular and including dielectric layers and ferromagnetic layers alternately stacked on one another into recesses of a nonmagnetic holder including the recesses each including a bottom surface being flat and parallel to a horizontal direction, placing a nonmagnetic lid above the holder at a predetermined distance from the bottom surface, and causing a magnetic field with a magnetic flux line intersecting perpendicularly with the bottom surface to act on the multilayer components in the recesses to rotate the multilayer components about longitudinal axes of the multilayer components to have the ferromagnetic layers parallel to the magnetic flux line.

In an aspect of the present disclosure, a method for manufacturing multilayer ceramic components includes the alignment method described above, and processing surfaces of the multilayer components aligned in a same orientation and then firing the multilayer components.

DESCRIPTION OF EMBODIMENTS

The objects, features, and advantages of the present disclosure will become more apparent from the following detailed description and the drawings.

Recent small and highly functional electronic devices incorporate smaller electronic components. Examples of such electronic components include a multilayer ceramic capacitor typically with a size of 1 mm or less on each side.

The manufacturing processes of such multilayer ceramic capacitors include polishing the end faces or side surfaces of base components and attaching, for example, protective layers. These processes are performed after the multiple base components are rotated to have their processing target surfaces facing upward. For example, Patent Literature 1 describes a method for aligning chip components by moving a magnet relative to the chip components accommodated in accommodation spaces to align the internal electrodes orthogonal to the bottom surfaces of the accommodation spaces. This alignment method uses the magnetization direction of the magnet greater than or equal to 0° and less than 90° with respect to the longitudinal direction of the chip components.

With the method described in Patent Literature 1, the magnet may be moved multiple times to align all the chip components, taking a long alignment time. Although slowly moving the magnet once can align more chip components and reduce the number of movements, this method still takes a long alignment time and can cause magnetization of chip components.

A method for aligning multilayer components and a method for manufacturing multilayer ceramic components according to one or more embodiments of the present disclosure will now be described with reference to the drawings. Multilayer ceramic capacitors will be described as example multilayer components below. However, the multilayer components to be aligned or manufactured in the embodiments of the present disclosure are not limited to the multilayer ceramic capacitors, and may be any of various other multilayer ceramic components including ferromagnetic layers such as multilayer piezoelectric elements, multilayer thermistor elements, multilayer chip coils, and multilayer ceramic substrates.

Figure 1A:
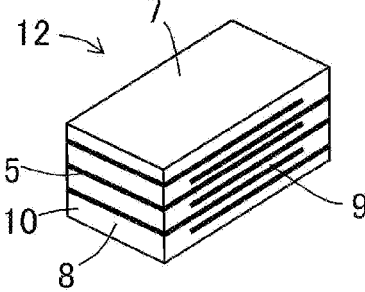
FIG. 1A is a diagram of a base precursor.
Figure 1B:
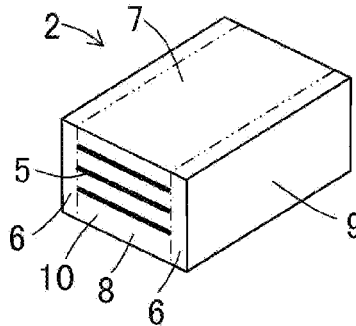
FIG. 1B is a diagram of a base component.

A multilayer ceramic capacitor as an example of a multilayer component will be described first. FIGS. 1A to 1E are each a perspective view of the multilayer component and the multilayer ceramic capacitor. FIG. 1A is a diagram of a base precursor 12. FIG. 1B is a diagram of a base component 2. The base component shrinking after firing has the same structure as before firing. The figures are thus also diagrams of the base components before and after firing. FIG. 1D is a perspective view of a multilayer ceramic capacitor 1. The multilayer ceramic capacitor 1 includes the base component 2 and external electrodes 3. As illustrated in FIG. 1B, the base component 2 is substantially rectangular. The base component 2 includes multiple dielectric layers 10 and multiple internal electrode layers 5 connected to the external electrodes 3. The external electrodes 3 are located on a pair of end faces of the base component 2 and extend to other adjacent faces. The internal electrode layers 5 extend inward from the pair of end faces of the base component 2 and are alternately stacked without contact with each other. The internal electrode layers 5 are, for example, ferromagnetic layers made of a ferromagnetic metal material.

Each external electrode 3 includes an underlayer connected to the base component 2 and a plated outer layer that facilitates mounting of external wiring to the external electrode 3 by soldering. The underlayer may be applied to the base component 2 after firing by thermal treatment. The underlayer may be placed on the base component 2 before firing and fired together with the base component 2. The external electrode 3 may include multiple underlayers and multiple plated outer layers to have an intended function. The external electrode 3 may include no plated outer layer and may include the underlayer and a conductive resin layer.

The base component 2 includes the base precursor 12 illustrated in FIG. 1A and protective layers 6 attached to the base precursor 12. The base precursor 12 is substantially rectangular. The base precursor 12 includes main surfaces 7 opposite to each other, end faces 8 opposite to each other, and side surfaces 9 opposite to each other. The longitudinal direction of the base component 2 refers to the direction in which the long sides of the main surfaces 7 extend.

The internal electrode layers 5 are exposed on the end faces 8 and the side surfaces 9 of the base precursor 12. The protective layers 6 are located on the side surfaces 9 of the base precursor 12. The protective layers 6 reduce the likelihood of electrical short-circuiting between the internal electrode layers 5 exposed on one end face 8 and the internal electrode layers 5 exposed on the other end face 8. The protective layers 6 also physically protect portions of the internal electrode layers 5 exposed on the side surfaces 9 of the base precursor 12. The protective layers 6 are attached in a final process in manufacturing the base component 2. The protective layers 6 may be made of a ceramic material. In this case, the protective layers 6 may be insulating and have high mechanical strength. The ceramic material to be the protective layers 6 is normally applied to the base precursor 12 before firing. The boundaries between the base precursor 12 and the protective layers 6 indicated by the two-dot-dash lines in FIG. 1B actually appear unclear.

Figure 1C:
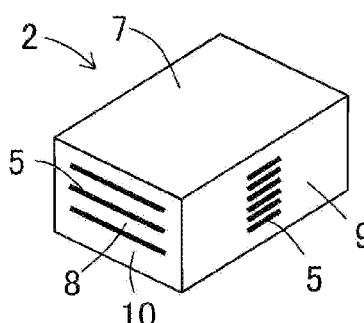
FIG. 1C is a perspective view of a base component in another example.
Figure 1D:
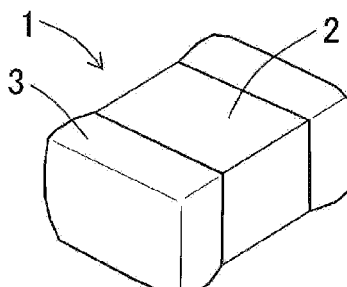
FIG. 1D is a perspective view of a multilayer ceramic capacitor.
Figure 1E:
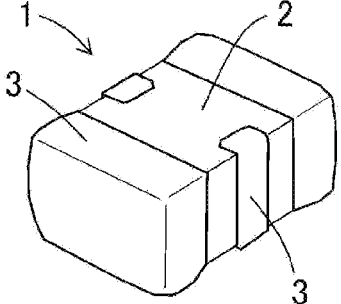
FIG. 1E is a perspective view of a multilayer ceramic capacitor in another example.

FIG. 1C is a perspective view of a base component 2 in another example. The internal electrode layers 5 are partially exposed on the surfaces of the protective layers 6. FIG. 1E is a perspective view of a multilayer ceramic capacitor 1 in another example. The multilayer ceramic capacitor 1 further includes external electrodes 3 connected to the internal electrode layers 5 exposed on the end faces 8 and the side surfaces 9. These external electrodes 3 are attached on target surfaces aligned in the same orientation. The external electrodes 3 may be attached to the base component 2 before or after firing.

The base precursor 12, which is the precursor of the base component 2, is described above in addition to the base component 2. The multilayer component in one or more embodiments of the present disclosure includes both the base component 2 and the base precursor 12.

With the method for aligning multilayer components according to the present embodiment described below, the internal electrode layers 5 are to have high magnetic susceptibility to respond to a magnetic field. For the base component 2 or the base precursor 12 before firing, nickel particles in the internal electrode layers 5 are surrounded by an organic binder and are mostly out of contact with each other. To increase the magnetic susceptibility of the internal electrode layers 5, the internal electrode layers 5 may have, for example, a content of the organic binder being 1.5 times or less, by volume, the content of nickel particles being a ferromagnetic metal material.

Figure 2:
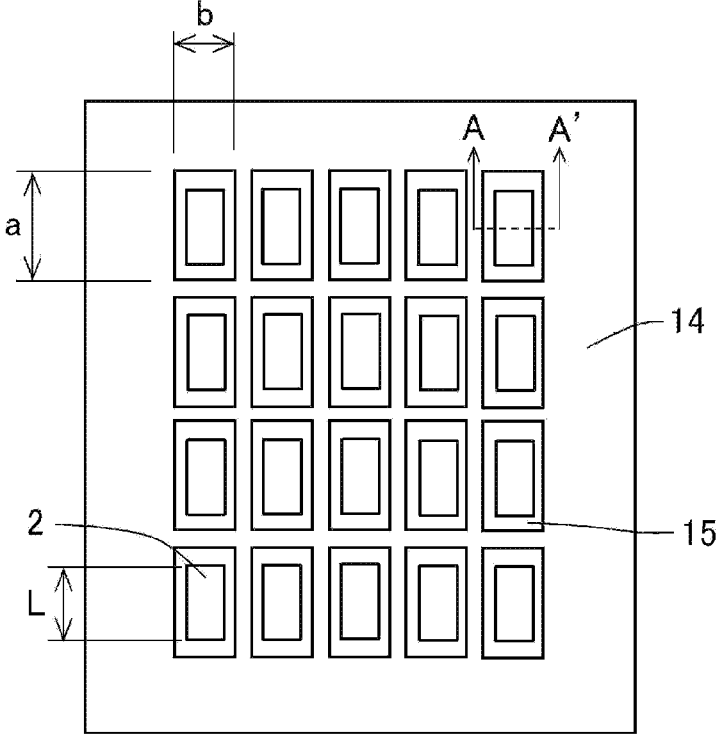
FIG. 2 is a plan view of a holder.

FIG. 2 is a plan view of a holder 14. In the present embodiment, the method for aligning multilayer components causes a magnetic field to act on the base components (multilayer components) 2 accommodated in recesses 15 of the holder 14 and rotates the base components 2 to change the orientations of the base components 2 as intended. The holder 14 is made of a nonmagnetic material and includes multiple recesses 15 each having a flat bottom surface 17 parallel to the horizontal direction. In the present embodiment, a single recess 15 accommodates a single base component 2. When the base components 2 are placed in the recesses 15 without being aligned intentionally, the base components 2 face in various directions without being aligned. Each base component 2 is rectangular as described above, and each recess 15 accommodating the base component 2 is also rectangular. The recess 15 has a rectangular opening having a dimension (length) a on its long side and a dimension (width) b on its short side. When the base component 2 has the dimensional relationship of b<L<a, where L is the longitudinal dimension of the base component 2, the base component 2 is accommodated in the recess 15 with its longitudinal direction aligned with the longitudinal direction of the recess 15.

Although the recesses 15 are arranged in a matrix as viewed in plan in the example illustrated in FIG. 2, the recesses 15 may be arranged other than in a matrix. With the alignment method according to the present embodiment, the holder 14 and a magnet for generating a magnetic field may move relative to each other in any direction. The recesses 15 may thus be arranged in any direction with high flexibility. Each recess 15 may have any opening shape other than a rectangle, such as an hourglass shape. In this case, the recess 15 has curved side surfaces 16.

Figure 3:
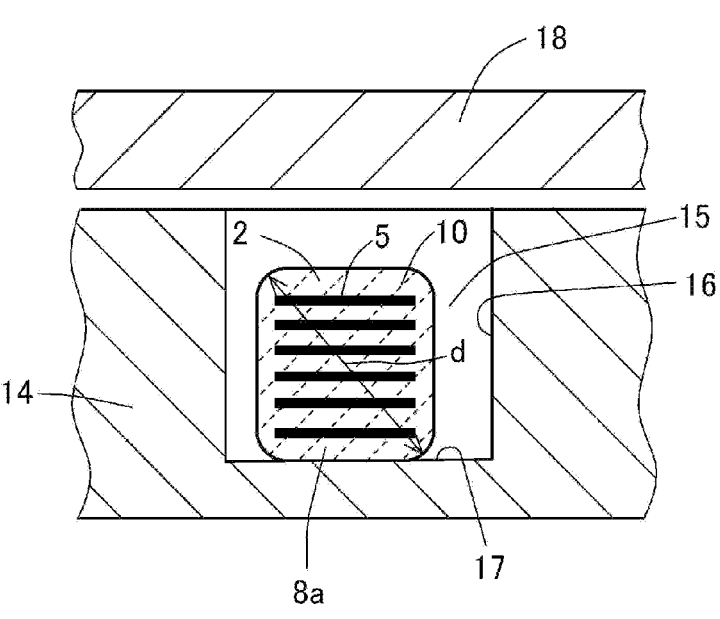
FIG. 3 is a cross-sectional view of a recess accommodating the base component.

FIG. 3 is a cross-sectional view of an example recess 15 accommodating the base component 2 in FIG. 1C. FIG. 3 is a cross-sectional view of the recess 15 having the longitudinal direction aligned with the longitudinal direction of the base component 2, as viewed in a direction orthogonal to the longitudinal directions. The diagonal length of a cross section 8a is denoted with d. The width b of the recess 15 is greater than the diagonal length d of the end face 8 of the base component 2. This allows the base component 2 accommodated in the recess 15 to rotate about its longitudinal axis. When the base component 2 includes chamfered and round corners, the diagonal length d on the cross section 8a of the base component 2 is the maximum length of the cross section 8a in its diagonal direction. The side surface 16 of the recess 15 may have, for example, a height (depth of the recess 15) greater than the diagonal length d on the cross section 8a of the base component 2.

As illustrated in FIG. 3, a lid 18 is placed above the holder 14 at a predetermined distance from the bottom surface 17 of the recess 15. The lid 18 facilitates handling of the holder 14 accommodating the base components 2. The lid 18 reduces the likelihood that the base components 2 protrude from the recesses 15 or are oriented vertically in the recesses 15 under a magnetic field. The lid 18 may have a gap from the holder 14 or may be in contact with the holder 14. In the present embodiment, the lid 18 is, for example, a flat plate. The distance from the bottom surface 17 of each recess 15 to the lid 18 is greater than the diagonal length d on the cross section 8a of the base component 2, and is less than the length L of the base component 2. The lid 18 is not limited to the flat plate, and may have a recess facing the recess 15 of the holder 14.

Figure 4:
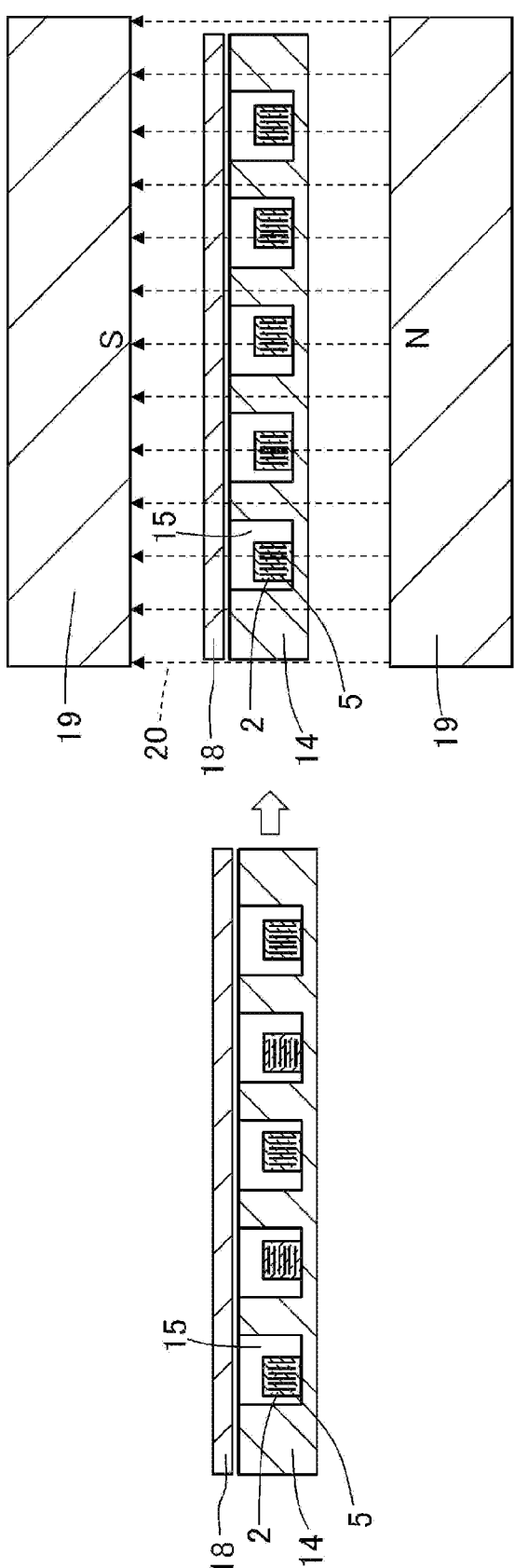
FIG. 4 is a schematic diagram illustrating an alignment method according to an embodiment.

FIG. 4 is a schematic diagram illustrating the alignment method according to the present embodiment. The alignment method according to the present embodiment is performed with the base components 2 accommodated in the holder 14 placed in an area of a magnetic field with an appropriate predetermined magnetic force. Two magnets are placed with different magnetic poles facing each other. In the example illustrated in FIG. 4, an upper second magnet 19 has the south(S) pole facing downward, whereas a lower first magnet 19 has the north (N) pole facing upward. The first and second magnets 19 in this arrangement generate a magnetic field with magnetic flux lines 20 directed from the lower N pole to the upper S pole. The two magnets can generate the magnetic flux lines 20 parallel to one another in a wide area.

The base components 2 are placed in the recesses 15 of the holder 14 before the holder 14 is covered with the lid 18. As described above, the dimensional relationship between the base component 2 and the recess 15 allows the base component 2 to be accommodated in the recess 15 with its longitudinal direction consistently aligned with the longitudinal direction of the recess 15. However, when the base component 2 is placed in the recess 15 without any intention, the base component 2 has either the side surfaces 9 parallel to the bottom surface 17 of the recess 15 (first state) or the main surfaces 7 parallel to the bottom surface 17 of the recess 15 (second state). In the example illustrated in FIG. 4, three of the five base components 2 are in the first state, and the remaining two are in the second state. The base components 2 typically have the side surfaces 9 to be processed. All the base components 2 are thus to be aligned to be in the first state.

The holder 14 accommodating the base components 2 and the lid 18 are moved to an intermediate position between the two magnets 19. Under such a magnetic field, the base components 2 accommodated in the recesses 15 rotate about their longitudinal axes and have the surfaces of the internal electrode layers 5 parallel to the magnetic flux lines 20. The base components 2 in the second state in the recesses 15 thus rotate to be in the first state, while the base components 2 in the first state remain in the first state. All the base components 2 can thus be aligned to be in the first state.

The magnetic field acting on the base components 2 as in the present embodiment rotates the base components 2 promptly. This shortens the time for aligning the base components 2 as compared with known methods. The magnetic field has the magnetic flux lines 20 intersecting perpendicularly with the bottom surfaces 17 of the recesses 15 of the holder 14 without any limitation on the direction or the speed of moving the holder 14 and the lid 18. This facilitates alignment of the base components 2.

In the example illustrated in FIG. 4, the holder 14 and the lid 18 are at an intermediate position between the two magnets 19, at which the magnetic field has the least effect. The holder 14 and the lid 18 at the intermediate position can thus reduce magnetization of the base components 2. When larger base components 2 or heavier base components 2 are aligned, the weaker magnetic field acting at the intermediate position may not allow some base components 2 to be in the first state, with the base components 2 remaining in the second state. The holder 14 and the lid 18 may be moved closer to one of the two magnets 19 to increase the effect of the magnetic field, allowing more reliable alignment of the base components 2. In this case, for example, the holder 14 and the lid 18 are first moved to the intermediate position, and then moved closer to the lower first magnet 19 or the upper second magnet 19. The holder 14 and the lid 18 may be moved toward the magnet 19 until all the base components 2 are aligned in the same orientation.

The magnet 19 with a stronger magnetic force facilitates alignment of the base components 2 having any size and any weight. However, the base components 2 are more likely to be magnetized. The base components 2 moved in two steps as described above first to the intermediate position and then toward the magnet 19 are less likely to have residual magnetization and can be aligned reliably. The position at which all the base components 2 can be aligned in the same orientation under the minimum magnetic force may be determined as described above. This can reduce the likelihood of the base components 2 having residual magnetization and achieve reliable alignment. The base components 2 aligned in the same orientation under the magnetic field may be removed after being moved to an area within the vertical magnetic field in which the base components do not rotate. This allows the base components 2 to remain aligned when removed. When the first and second magnets 19 are electromagnets, the base components 2 may be removed after the switch is turned off.

Figure 5:
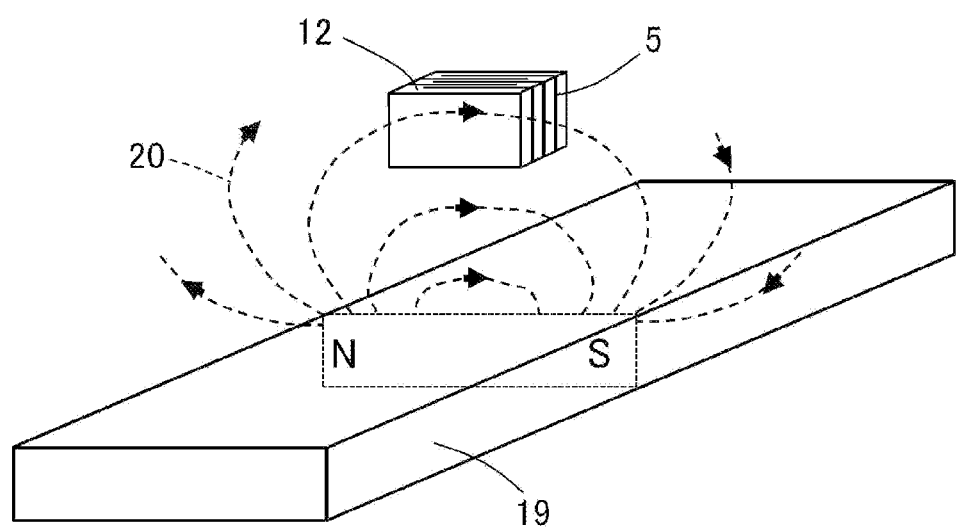
FIG. 5 is a schematic diagram of a magnetic field used with a known alignment method.
Figure 6:
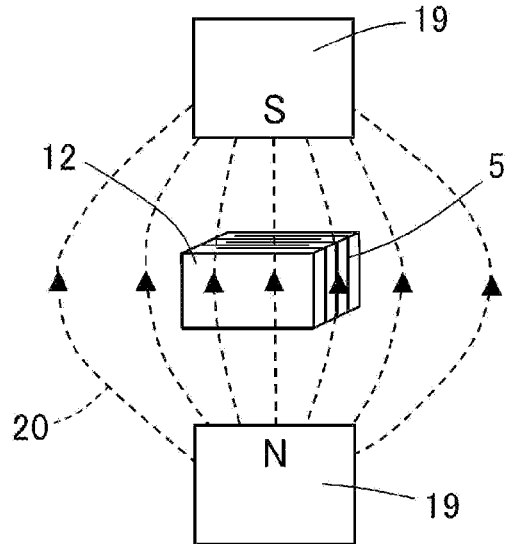
FIG. 6 is a schematic diagram of a magnetic field used with the alignment method according to the embodiment.

A magnetic field used with a known alignment method (FIG. 5) and the magnetic field used with the alignment method according to the present embodiment (FIG. 6) will be described using the base precursor 12. In the magnetic field used with a known alignment method, the magnetic flux lines 20 are parallel to (or intersect at a predetermined angle with) the longitudinal direction of the base precursor 12. In other words, the magnetization direction, which is the direction of the magnetic flux lines 20, is parallel to the bottom surfaces 17 of the recesses 15 of the holder 14. The base component 2 as the base precursor 12 moved relative to the magnets 19 crosses such a magnetic field to rotate. In the present embodiment, the magnetic flux lines 20 in the magnetic field intersect perpendicularly with the bottom surfaces 17 of the recesses 15. Thus, the base precursor 12 moving in any direction relative to the magnets 19 rotates promptly under a magnetic field.

Figure 7:
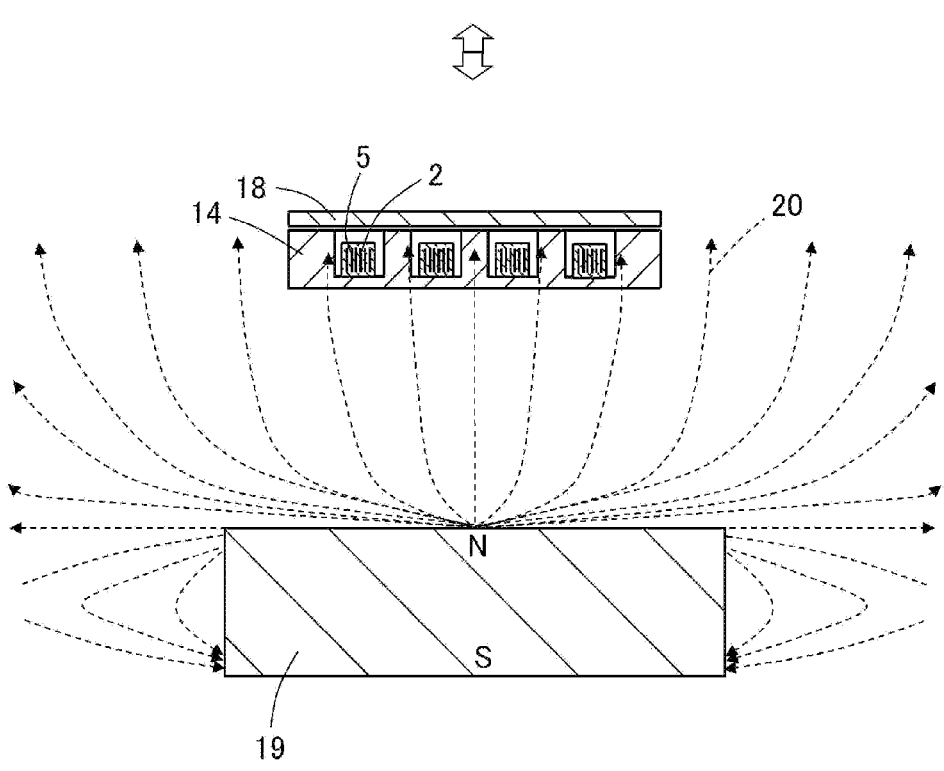
FIG. 7 is a schematic diagram illustrating an alignment method according to another embodiment.

FIG. 7 schematically illustrates the base components 2 aligned in the same orientation in another embodiment. This alignment uses a vertical magnetic field generated by a single plate magnet 19 having the opposite poles on its two flat surfaces. The holder 14 accommodating the base components 2 and the lid 18 are moved into the magnetic field from above the area of the vertical magnetic flux lines 20 to a position at which all the base components 2 are aligned in the same orientation. The holder 14 and the lid 18 are then moved upward in a direction perpendicular to the bottom surfaces 17 of the recesses 15. The base components 2 are removed after being moved to an area within the vertical magnetic field in which the base components 2 do not rotate. This allows the base components 2 to remain aligned when removed. As illustrated in FIG. 7, when a vertical magnetic field source is located below the holder 14, the alignment system can be simplified, and a camera and a sensor can be installed in the upper space, thus allowing monitoring of the alignment state of the base components 2 being aligned. The base components 2 are removed after moving upward to a position at which the magnetic force does not affect the base components 2.

The holder 14 accommodating the base components 2 and the lid 18 may be vibrated vertically while being moved into the magnetic field from above the area of the vertical magnetic flux lines 20 to a position at which all the base components 2 are aligned in the same orientation. The vertical vibration changes the force that attracts the base components 2 in the direction of the magnetic force and momentarily creates the suspended state of the base components 2 by causing the base components 2 to fall suddenly immediately after rising to the farthest position from the magnetic surface at which the magnetic force is minimum. This allows the base components 2 to rotate more smoothly.

Figure 8:
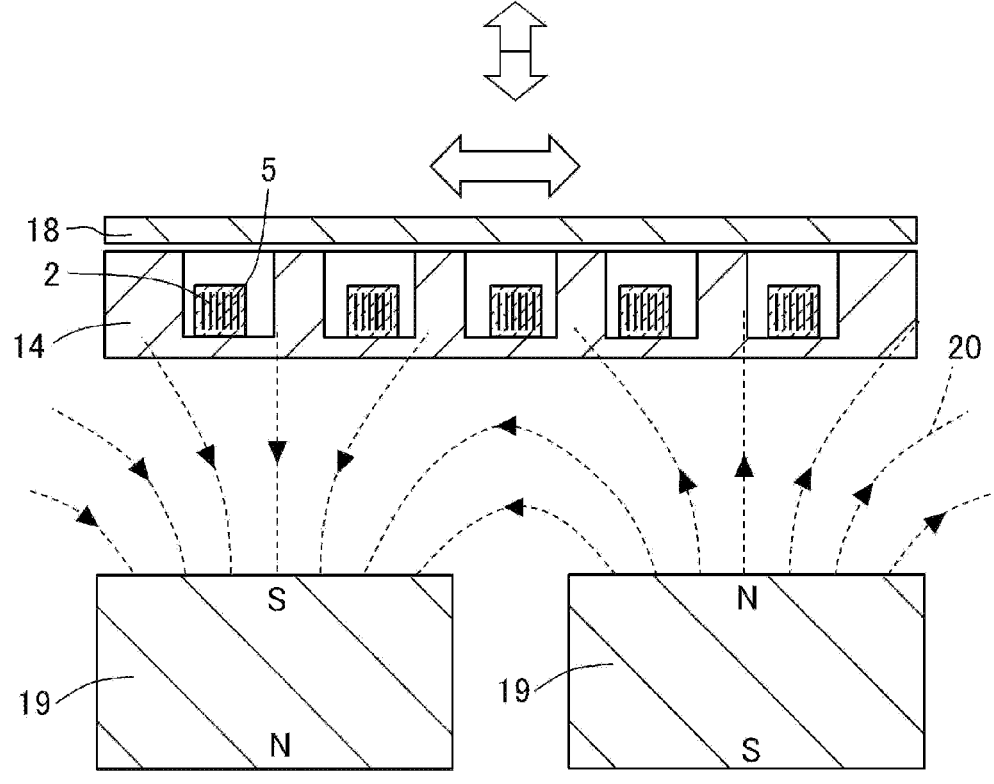
FIG. 8 is a schematic diagram illustrating an alignment method according to another embodiment.

FIG. 8 schematically illustrates the base components 2 aligned in the same orientation in another embodiment. Multiple elongated rod magnets 19 (two of them are illustrated in FIG. 8) extending in the direction into the page of the figure are arranged with their opposite poles on the upper surfaces. An area of a vertical magnetic field generated from the collective magnet surface is used to align the orientations of the base components 2. Vertical vibration or vibration in a direction across the space between the magnets 19 is applied to the holder 14 accommodating the base components 2 and the lid 18 while the holder 14 and the lid 18 are being moved into the magnetic field vertically from above the collective magnet surface. The vibration is stopped when all the base components 2 are aligned. Subsequently, the holder 14 and the lid 18 are moved upward, in a direction opposite to the direction in which the holder 14 and the lid 18 are moved into the magnetic field, to a position at which the magnetic force does not affect the base components 2, before the base components 2 are removed. The multiple rod magnets 19 arranged side by side can provide a large vertical magnetic field surface, allowing the process to be performed with high productivity at low costs. The collective magnet surface may have any overall shape based on the arrangement of the multiple rod magnets 19.

The vertical vibration is as described with reference to FIG. 7. The lateral vibration in FIG. 8 is applied to prevent the base components 2 from being affected by variations in the vertical magnetic flux distribution on the collective magnet surface. The vibration may not be applied in short cycles, but may have the amplitude set as appropriate based on the positions of the collective magnet surface and the base components 2 in the holder 14. The vibration may be started at the same time as the holder 14 is started to be moved into the magnetic field or while the holder 14 is being moved into the magnetic field. When the position at which all the base components 2 are aligned is predetermined, the vibration may be started after the holder 14 is placed at the position.

For the rod magnets arranged as illustrated in FIG. 8, vibration may be applied for the same reason as described above in a direction along a horizontal XY plane across the space between the magnets 19. In FIG. 8, the opposite poles of each magnet 19 are arranged in the vertical direction. However, the collective magnet surface generates magnetic lines of a vertical component as well. Thus, the opposite poles may also be arranged in the lateral direction to align the base components 2 with the vertical magnetic field component. The multiple magnets 19 may be arranged on, for example, a flat plate with their surfaces being flush with one another, or may be fixed with, for example, a resin to form an integral magnet plate.

In the magnetic field used in the present embodiment, the magnetic flux lines 20 may extend upward as in the example illustrated in FIG. 4 or downward. The magnets 19 may be two magnets having the S pole and the N pole on each surface, or may be upper and lower magnets 19 connected to each other. Multiple magnets 19 may be integrated together with the same magnetic pole being aligned. The magnets 19 may have the two ends being in contact with a ferromagnetic material. To generate a larger magnetic field, the magnets 19 may have the surfaces with the same magnetic pole aligned to be magnetized with a ferromagnetic plate.

The magnets 19 may be, for example, neodymium magnets. The magnets 19 may be electromagnets. Electromagnets can shorten the time for causing the magnetic field to act on the base components 2 to reduce the likelihood of magnetization of the base components 2. For example, the magnets 19 with no magnetic field being generated (turned off) and the holder 14 accommodating the base components 2 and the lid 18 are located to have a predetermined positional relationship. A current is then supplied to the electromagnets 19 (turned on) to generate a magnetic field. Once a magnetic field is generated, the accommodated base components 2 rotate promptly and are aligned. The electromagnets are then turned off. Additionally, when different types of base components 2 are aligned, the current to be supplied may be controlled to control the strength of the magnetic field to be generated.

In another embodiment, the base components 2 are vibrated. Under a weak magnetic field, the base components 2 cannot receive sufficient energy to rotate and may not be aligned in the same orientation. Under a stronger magnetic field, although the base components 2 can rotate, the strong magnetic field can cause the base components 2 to have residual magnetization as described above. The base components 2 vibrated can receive sufficient energy to rotate. Applying vibration to the base components 2 further reduces the magnetic force for aligning all the base components 2 in the same orientation. This thus reduces residual magnetization. Vibration can be applied to the holder 14 to indirectly vibrate the base components 2. Vibration may be applied in the horizontal direction or in the vertical direction, or may be applied in both the horizontal and vertical directions.

The holder 14 and the lid 18 may be made of a nonmagnetic material. Examples of the nonmagnetic material include metals, such as aluminum, copper, zinc, and stainless steel SUS 305, and a resin material such as Bakelite. The holder 14 and the lid 18 may be divided into two or more parts, or specifically, into a part defining the side surfaces 16 of the recesses 15 and a part defining the bottom surfaces 17. In this case, the material for the part defining the bottom surfaces 17 and the material for the lid 18 may be materials other than a nonmagnetic material. The materials other than the nonmagnetic material may be, for example, soft magnetic materials with high permeability and a low coercive force, such as ferrosilicon, permalloy, or ferrite stainless steel SUS 410.

Figure 9:
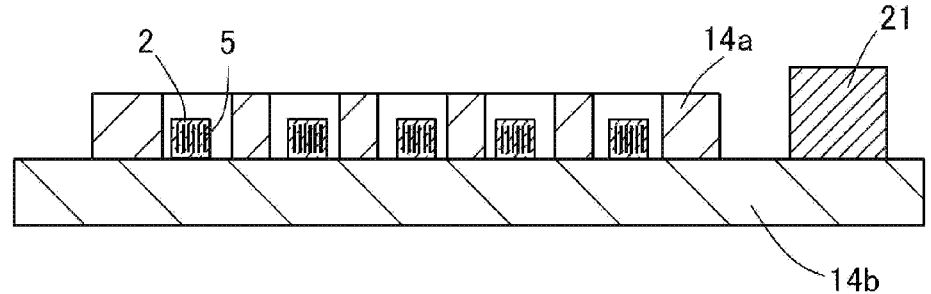
FIG. 9 is a schematic diagram of a holder including two members in another embodiment.

FIG. 9 is a schematic diagram of a holder 14 including two parts in another embodiment. The holder 14 may be dividable into a side wall member 14a having multiple through-holes with a rectangular cross section and a flat bottom wall member 14b. The inner surfaces of the through-holes in the side wall member 14a define side surfaces 16 of recesses 15. The surface of the bottom wall member 14b defines bottom surfaces 17 of the recesses 15. The side wall member 14a is made of a nonmagnetic material, and the bottom wall member 14b is made of a soft magnetic material.

When the holder 14 is moved after the base components 2 are aligned in the first state, any vibration during the movement may cause some of the aligned base components 2 to rotate. In the present embodiment, for example, a magnet 21 is placed into contact with the soft-magnetic bottom wall member 14b when the holder 14 is moved after the base components 2 are aligned. This causes the base components 2 to be magnetically attracted to the bottom wall member 14*b*, thus allowing the aligned base components 2 to remain in the first state while the holder 14 is being moved. After the holder 14 is moved, the magnet 21 is detached from the bottom wall member 14*b*. The soft-magnetic bottom wall member 14*b* is magnetized while being in contact with the magnet 21 and is demagnetized when the magnet 21 is detached.

The lid 18 may be entirely made of a flexible and soft material, with its lower surface, or more specifically, the surface facing the holder 14, being an adhesive surface. When an external force is applied downward to the lid 18 after the base components 2 are aligned in the first state, the base components 2 are attached to the adhesive surface of the lid 18. In the subsequent processes, the holder 14 may be unused, and the lid 18 to which the base components 2 are attached may be used.

A method for manufacturing the base components 2 and the multilayer ceramic capacitors 1 will now be described. The manufacturing method includes the alignment method described above.

A ceramic mixture powder containing a ceramic dielectric material of $BaTiO_3$ with an additive is first wet-milled and blended using a bead mill. A polyvinyl butyral binder, a plasticizer, and an organic solvent are added to this milled and blended slurry and are mixed together to prepare ceramic slurry.

A die coater is then used to shape a ceramic green sheet on a carrier film. The ceramic green sheet may have a thickness of, for example, about 1 to 10 μm. A thinner ceramic green sheet can increase the capacitance of the multilayer ceramic capacitors. The ceramic green sheet may be shaped with, for example, a doctor blade coater or a gravure coater, rather than with the die coater.

A conductive paste containing nickel (Ni) being a ferromagnetic metal material, which is to be the internal electrode layers, is then printed in a predetermined pattern by screen printing on the prepared ceramic green sheet. The conductive paste may be printed by, for example, gravure printing, rather than by screen printing. The conductive paste may contain a metal such as Pd, Cu, or Ag or an alloy of these metals other than Ni.

After printing, the conductive paste is dried. During drying, the solvent mostly volatilizes. The internal electrode layers after drying thus contain nickel particles dispersed in the organic binder. A thinner internal electrode layer that allows the capacitor to function reduces internal defects caused by internal stress. For a capacitor with a stack of many layers, the internal electrode layers may each have, for example, a thickness of 2.0 μm or less.

A predetermined number of ceramic green sheets with printed internal electrode layers are stacked on a stack of a predetermined number of ceramic green sheets, and a predetermined number of ceramic green sheets are stacked on the stack of ceramic green sheets with the printed internal electrode layers. The predetermined number of ceramic green sheets with the printed internal electrode layers are stacked to have the patterns of the internal electrodes layers deviating from each other.

The stack of multiple layers of the ceramic green sheets is then pressed in the stacking direction to obtain a multilayer base. The stack may be pressed using, for example, a hydrostatic press device. In the multilayer base, the internal electrode layers are buried in layers between the ceramic green sheets. The multilayer base is cut vertically and horizontally to be the base precursors 12 illustrated in FIG. 1A.

The base precursors 12 or the base components 2 are then aligned with the alignment method described above to perform appropriate processes on the side surfaces 9 of the base components 2. The processes may include a process of forming the protective layers 6 on the base precursors 12 or a process of polishing the base components 2.

The base components 2 obtained as described above are then fired. The external electrodes 3 are formed to complete the multilayer ceramic capacitors 1. The firing temperature may be set as appropriate for, for example, the metal material contained in the conductive paste for the dielectric layers 10 and the internal electrode layers 5. The firing temperature may be, for example, 1100 to 1250° C.

The present disclosure may be implemented in the following forms.

In one or more embodiments of the present disclosure, a method for aligning multilayer components includes placing multilayer components each being rectangular and including dielectric layers and ferromagnetic layers alternately stacked on one another into recesses of a nonmagnetic holder including the recesses each including a bottom surface being flat and parallel to a horizontal direction, placing a nonmagnetic lid above the holder at a predetermined distance from the bottom surface, and causing a magnetic field with a magnetic flux line intersecting perpendicularly with the bottom surface to act on the multilayer components in the recesses to rotate the multilayer components about longitudinal axes of the multilayer components to have the ferromagnetic layers parallel to the magnetic flux line.

In one or more embodiments of the present disclosure, a method for manufacturing multilayer ceramic components includes the alignment method described above, and processing surfaces of the multilayer components aligned in a same orientation and then firing the multilayer components.

In one or more embodiments of the present disclosure, the method for aligning multilayer components reduces the likelihood of the multilayer components having residual magnetization and allows the multilayer components to rotate promptly to change their orientations.

In one or more embodiments of the present disclosure, the method for manufacturing the multilayer ceramic components allows multilayer ceramic components to be manufactured promptly.

Although embodiments of the present disclosure have been described in detail, the present disclosure is not limited to the embodiments described above, and may be changed or varied in various manners without departing from the spirit and scope of the present disclosure. The components described in the above embodiments may be entirely or partially combined as appropriate unless any contradiction arises.

REFERENCE SIGNS

1 multilayer ceramic capacitor
2 base component
3 external electrode
5 internal electrode layer
6 protective layer
7 main surface
8 end face
8*a* cross section
9 side surface
10 dielectric layer
12 base precursor
14 holder
14*a* side wall member 14*b* bottom wall member
15 recess
16 side surface
17 bottom surface
18 lid
19 magnet
21 magnet
20 magnetic flux line

The invention claimed is:

1. A method for aligning multilayer components, the method comprising:

placing multilayer components into recesses of a holder, each of the multilayer components being rectangular and including dielectric layers and ferromagnetic layers alternately stacked on one another, each of the recesses including a bottom surface being flat and parallel to a horizontal direction;

placing a lid above the holder at a predetermined distance from the bottom surface; and causing a magnetic field with a magnetic flux line intersecting perpendicularly with the bottom surface to act on the multilayer components in the recesses to rotate the multilayer components about longitudinal axes of the multilayer components to have the ferromagnetic layers parallel to the magnetic flux line, wherein when rotating the multilayer components about the longitudinal axes, the method includes:

generating the magnetic field by using a first magnet and a second magnet located above the first magnet, moving the holder and the lid in the horizontal direction to an intermediate position between the first magnet and the second magnet, and thereafter moving the holder and the lid in a vertical direction closer to the first magnet or the second magnet.

2. The method according to claim 1, further comprising:

applying vibration to the multilayer components in the recesses.

3. The method according to claim 1, wherein the multilayer components in the recesses are aligned in a magnetic field area with a predetermined magnetic force.

4. The method according to claim 1, wherein each of the recesses is rectangular, and each of the recesses has a width of the bottom surface and a distance from the bottom surface to the lid, the width and the distance are both greater than a diagonal length of each of the multilayer components in a cross section perpendicular to a longitudinal direction of the multilayer component and less than a longitudinal length of each of the multilayer components.

5. A manufacturing method for multilayer ceramic components, the manufacturing method comprising:

the method according to claim 1; and processing surfaces of the multilayer components aligned in a same orientation and then firing the multilayer components.

* * * * *